United States Patent
Parker et al.

(10) Patent No.: US 6,985,060 B2
(45) Date of Patent: Jan. 10, 2006

(54) CONTROL UNIT FOR VEHICLE BRAKE SYSTEM

(75) Inventors: Dion S. Parker, Livonia, MI (US); Timothy E. Hughes, Livonia, MI (US); Douglas Lewin, Cement City, MI (US); Paolo Rea, Dearborn, MI (US); David E. Collins, Dearborn, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/466,226

(22) PCT Filed: Jan. 11, 2002

(86) PCT No.: PCT/US02/04678

§ 371 (c)(1),
(2), (4) Date: Nov. 24, 2003

(87) PCT Pub. No.: WO02/055355

PCT Pub. Date: Jul. 18, 2002

(65) Prior Publication Data

US 2004/0070302 A1 Apr. 15, 2004

(51) Int. Cl.
B60T 8/36 (2006.01)

(52) U.S. Cl. ........................ 335/282; 335/278; 335/299; 336/192; 303/119.2

(58) Field of Classification Search ................ 335/278, 335/282, 296, 299; 303/113.1, 119.1–119.3; 336/192; 337/884; 251/129.01, 129.15
See application file for complete search history.

(56) References Cited

U.S. PATENT DOCUMENTS

| 5,374,114 A | 12/1994 | Burgdorf et al. |
| 5,482,362 A | 1/1996 | Robinson |
| 5,513,905 A | 5/1996 | Zeides et al. |
| 5,520,447 A | 5/1996 | Burgdorf et al. |
| 5,662,392 A | * 9/1997 | Hinz ........................ 303/119.2 |
| 5,688,028 A | 11/1997 | Kohno et al. |
| 5,823,507 A | 10/1998 | Inden et al. |
| 5,887,624 A | 3/1999 | Taniguchi et al. |
| 6,124,772 A | 9/2000 | Heise |

FOREIGN PATENT DOCUMENTS

| DE | 19644963 | 5/1997 |
| DE | 19612907 | 10/1997 |
| EP | 0 691 250 A1 | 1/1996 |
| EP | 0728645 | 8/1996 |
| GB | 2 249 874 A | 5/1992 |
| GB | 2 313 484 A | 11/1997 |

* cited by examiner

Primary Examiner—Ramon M. Barrera
(74) Attorney, Agent, or Firm—MacMillan, Sobanski & Todd, LLC (57) ABSTRACT

A control unit having a circuit substrate mounted within a housing that is adapted to be mounted upon a hydraulic valve body with a coil spacer mounted upon said substrate. The coil spacer including at least one coil support ring having resilient member extending in a radial direction from the edge of the ring into the center of the ring. The control unit also including a solenoid coil and flux casing assembly mounted upon the coil spacer ring with the solenoid coil and flux casing assembly flexing the resilient member such that the resilient member urges flux casing away from the coil spacer.

17 Claims, 11 Drawing Sheets

CONTROL UNIT FOR VEHICLE BRAKE SYSTEM

BACKGROUND OF THE INVENTION

This invention relates in general to a solenoid coil assembly included in a vehicle anti-lock brake system and more particularly to a solenoid coil assembly that provides compensation for manufacturing tolerances.

An anti-lock brake system (ABS) is often included as standard equipment on new vehicles. When actuated, the ABS is operative to control the operation of some or all of the vehicle wheel brakes. A typical ABS includes a plurality of normally open and normally closed solenoid valves which are mounted within a control valve body and connected to the vehicle hydraulic brake system. Usually, a separate hydraulic source, such as a motor driven pump, is included in the ABS for reapplying hydraulic pressure to the controlled wheel brakes during an ABS braking cycle. The pump is typically included within the control valve body while the pump motor is mounted upon the exterior of the control valve body.

An ABS further includes an Electronic Control Unit (ECU) which has a microprocessor. The control unit is electrically coupled to the pump motor, a plurality of solenoid coils associated with the solenoid valves and wheel speed sensors for monitoring the speed and deceleration of the controlled wheels. The control unit is typically mounted upon the control valve body to form a compact unit which is often referred to as an ABS electro-hydraulic control unit or Hydraulic Control Unit (HCU).

During vehicle operation, the microprocessor in the ABS ECU continuously receives speed signals from the wheel speed sensors. The microprocessor monitors the wheel speed signals for a potential wheel lock-up condition. When the vehicle brakes are applied and the microprocessor senses an impending wheel lock-up condition, the microprocessor is operative to actuate the pump motor and selectively operate the solenoid valves in the control unit to cyclically relieve and reapply hydraulic pressure to the controlled wheel brakes. The hydraulic pressure applied to the controlled wheel brakes is adjusted by the operation of the solenoid valves to limit wheel slippage to a safe level while continuing to produce adequate brake torque to decelerate the vehicle as desired by the driver.

As described above, an ABS typically includes a plurality of solenoid valves for controlling the flow of hydraulic fluid to the vehicle wheel brakes. Solenoid valves are electrically actuated by supplying an energizing current to a solenoid coil assembly. A typical coil assembly includes a coil in the form of an insulated magnet wire wound on an insulated bobbin. The bobbin supports a pair of terminal leads. The ends of the coil magnet wire are wound upon the terminal leads. The terminal leads are connected through an electronic switch to a voltage supply. When the electronic switch is in a conducting state, current passes through the magnet wire and produces a magnetic field.

Solenoid valves also include an axially shiftable armature that is disposed within a valve sleeve. The solenoid coil assembly is carried by the valve sleeve. The armature is biased by spring to maintain a valve ball in a normally opened or closed position. The valve ball is adapted to cooperate with a valve seat member, which is provided in a valve body. The solenoid coil assemblies are typically enclosed within a cup-shaped a flux return casing. An annular flux ring is often disposed within an open end of the flux casing. The annular flux ring completes a magnetic flux path that is adapted to pass through the armature and the valve seat member.

To actuate the valve, electric current is supplied through the terminal leads to the solenoid coil. The current establishes a magnetic field in the armature, which pulls the armature against the force of the spring to open or close the valve ball. An interruption in the current causes the magnetic field to collapse. This allows the spring to return the armature to its normal position.

To insure proper operation of the valve, the armature and sleeve must fit within a close tolerance of the bobbin. The bobbin must fit within a close tolerance of the flux return casing. Moreover, the annular flux ring, the flux return casing, the armature, and the valve seat member must make sufficient contact with one another to assure an optimal flux path.

A plurality of valves are usually mounted upon a hydraulic control unit. Each of the valves is controlled by a separate solenoid coil assembly. The coil assemblies are typically controlled by an electronic control unit. The electronic control unit is often coupled to the coil assemblies via a lead frame or printed circuit board that supports a plurality of coil assemblies. The lead frame or printed circuit board includes a pair of holes for receiving the terminals of each of the solenoid coil assemblies.

A problem exists with positioning the coil assemblies relative to respective valves due to manufacturing tolerances. For example, the terminals of a plurality of coil assemblies are connected to a lead frame or a multi-chip module. A plurality of valves are mounted upon by a hydraulic control unit. Each of the coil assemblies, though connected to the lead frame or multi-chip module, must align with a corresponding valve sleeve. This often requires that a certain amount of play or spacing exist between the coil assembly bobbins and the valve sleeves as a result of manufacturing tolerances. The play reduces the magnetic field established in the armature. In addition, an inability to control the position of the flux return casings relative to their respective valve seats may result in insufficient contact between the flux return casings and the valve seats. This further reduces the magnetic field established in the armature.

A coil assembly is needed that fits snuggly about the valve cartridge armature and that encounters minimal axial translation resulting from manufacturing tolerances to maximize the magnetic flux through the valve armature.

SUMMARY OF THE INVENTION

The present invention is directed toward a solenoid coil assembly that provides compensation for manufacturing tolerances.

The present invention contemplates a coil assembly that comprises a coil wound upon a bobbin. A pair of terminals is supported by the bobbin. The coil has a pair of lead wires, each of which is connected to one of the terminals. Each terminal is adapted to be coupled to an electronic control unit. The coil is enclosed at least in part by a flux return casing. At least one resilient member is arranged and configured to urge the bobbin and the casing axially downward.

The present invention also contemplates an electronic control unit that includes a housing adapted to be mounted upon a hydraulic valve body. A circuit substrate is mounted within the housing and a coil spacer is mounted upon the circuit substrate. The coil spacer includes at least one coil support ring having a resilient member extending in a radial direction from the edge of the ring into the center of the ring. A solenoid coil and flux casing assembly is mounted upon the coil spacer ring with the coil flexing the resilient member such that the resilient member urges the flux casing away from the coil spacer and toward the hydraulic valve body. In the preferred embodiment, the coil spacer also includes an electrical connector for at least one pressure sensor and an electrical connector for a pump motor.

The present invention further contemplates a method for assembling an electronic control unit that includes providing at least one solenoid coil and mounting the solenoid coil upon a coil spacer. The coil spacer is mounted upon a circuit substrate to form an assembly and the assembly is inserted into a housing. As a further step, the housing is mounted upon a hydraulic valve body to form a hydraulic control unit.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
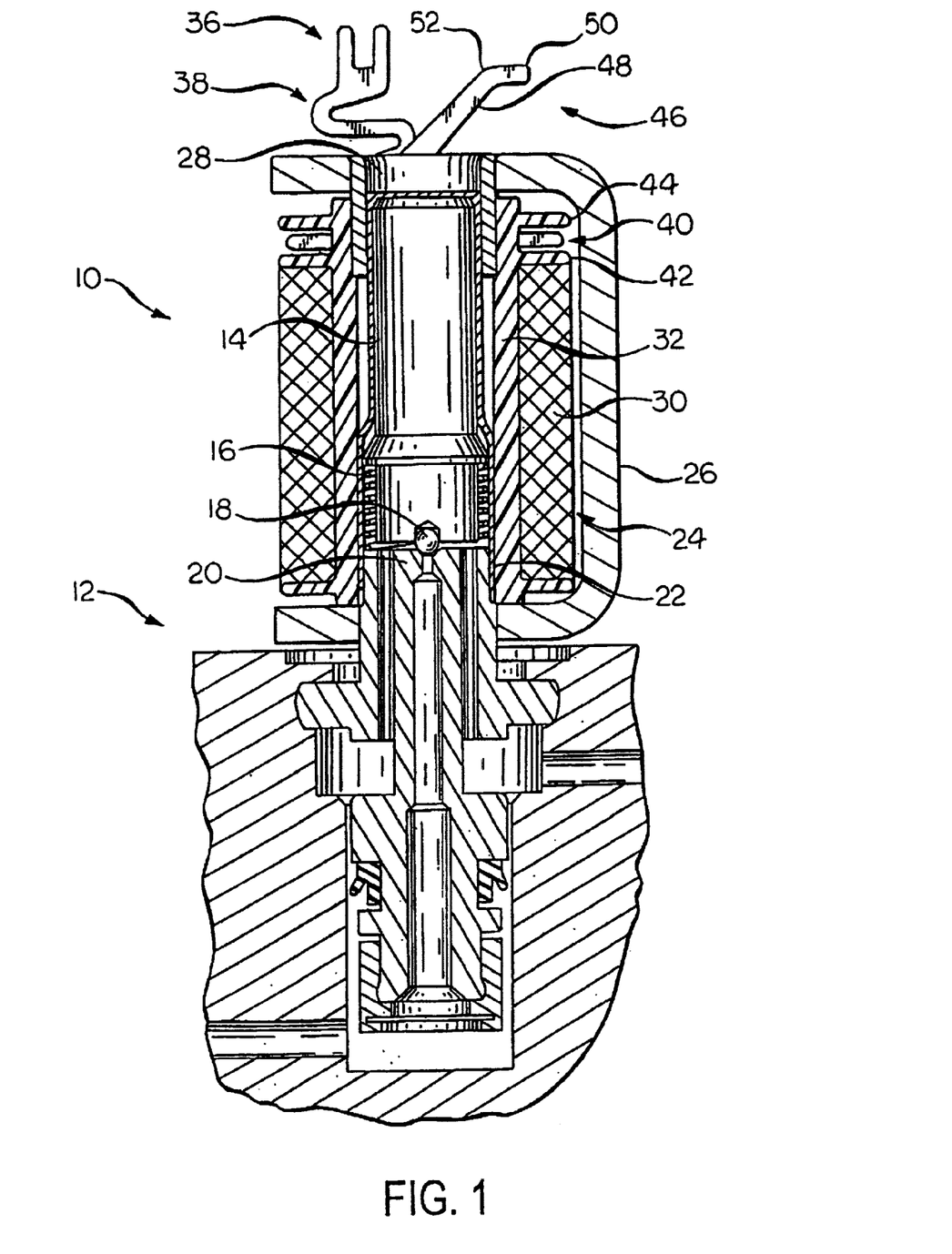
FIG. 1 is a side elevational view of a self-locating coil assembly according to the invention carried by a solenoid valve that is supported by a valve body.

Referring now to FIG. 1, there is shown a sectional view of a solenoid valve 10 mounted upon a valve body 12. The valve 10 includes an axially shiftable armature 14, which is biased in an upward direction by a biasing element, such as the spring 16 shown. The spring 16 maintains a valve ball 18 in a normally opened position. Alternatively, a biasing element may be provided to maintain the valve ball 18 in a normally opened position. The valve ball 18 is adapted to cooperate with a valve seat member 20, which is provided in the valve body 12. The armature 14 is adapted to slide within a valve sleeve 22.

A coil assembly is carried by the valve sleeve 22. The coil assembly includes a solenoid coil 24. The coil 24 may be comprised of a coil winding 30 formed from multiple turns of an insulated magnet wire having a round cross-section, such as # 28½ magnet wire. The coil wire is preferably a helical coil wound upon a bobbin 32. The bobbin 32 is formed of a non-conductive material. The bobbin 32 supports a pair of terminal supports 34. Each of the supports 34 is adapted to support a terminal 36. A lead wire (not shown) of the coil winding 30 is wound around a lower end of the terminals 36 and soldered thereto. Any remaining portion of the lead wires may be tucked into a channel 40 bounded between two vertically spaced flanges 42, 44 at the upper end of the bobbin 32. An upper end of each terminal 36 may be coupled to an electrical control unit, such as by a lead frame or multi-chip module.

The lead frame or multi-chip module may support a plurality of coils for controlling a plurality of valves in a hydraulic control unit. The lead frame or multi-chip module would include a pair of holes for receiving each pair of terminals. In a preferred embodiment of the invention, the terminals 36 are compliant to enable the coil assembly to be positioned relative to a corresponding valve. The particular terminals 36 illustrated include an intermediate portion 38 that is extendable, retractable, and laterally displaceable. This is accomplished by providing segments of the intermediate portion 38 that bend and overlap. Although other configurations are conceivable, the segments bend and overlap to form a substantially S-shaped configuration that is extendable, retractable, and laterally displaceable.

The coil 24 is enclosed at least in part by a metal flux return casing 26. An annular flux ring 28 is disposed within an opening at the upper end of the bobbin 12. The flux ring 28 is adapted to engage the flux return casing 26. The flux ring 28 and the flux return casing 26 may be of unitary construction. The flux return casing 26 and flux ring 28 complete a magnetic flux path that passes through the armature 14 and the valve seat member 20.

To actuate the valve 10, electric current is supplied through the terminals 36 to the coil 24. The current establishes a magnetic field in the armature 14, which pulls the armature 14 in a downward direction, closing the valve ball 18. An interruption in the current causes the magnetic field to collapse. This allows the spring 16 to return the armature 14 to its original position, thereby reopening the valve ball 18. Other solenoid valves, such as normally closed solenoid valves, may have structures similar to the normally open valve 10 described above.

Figure 2:
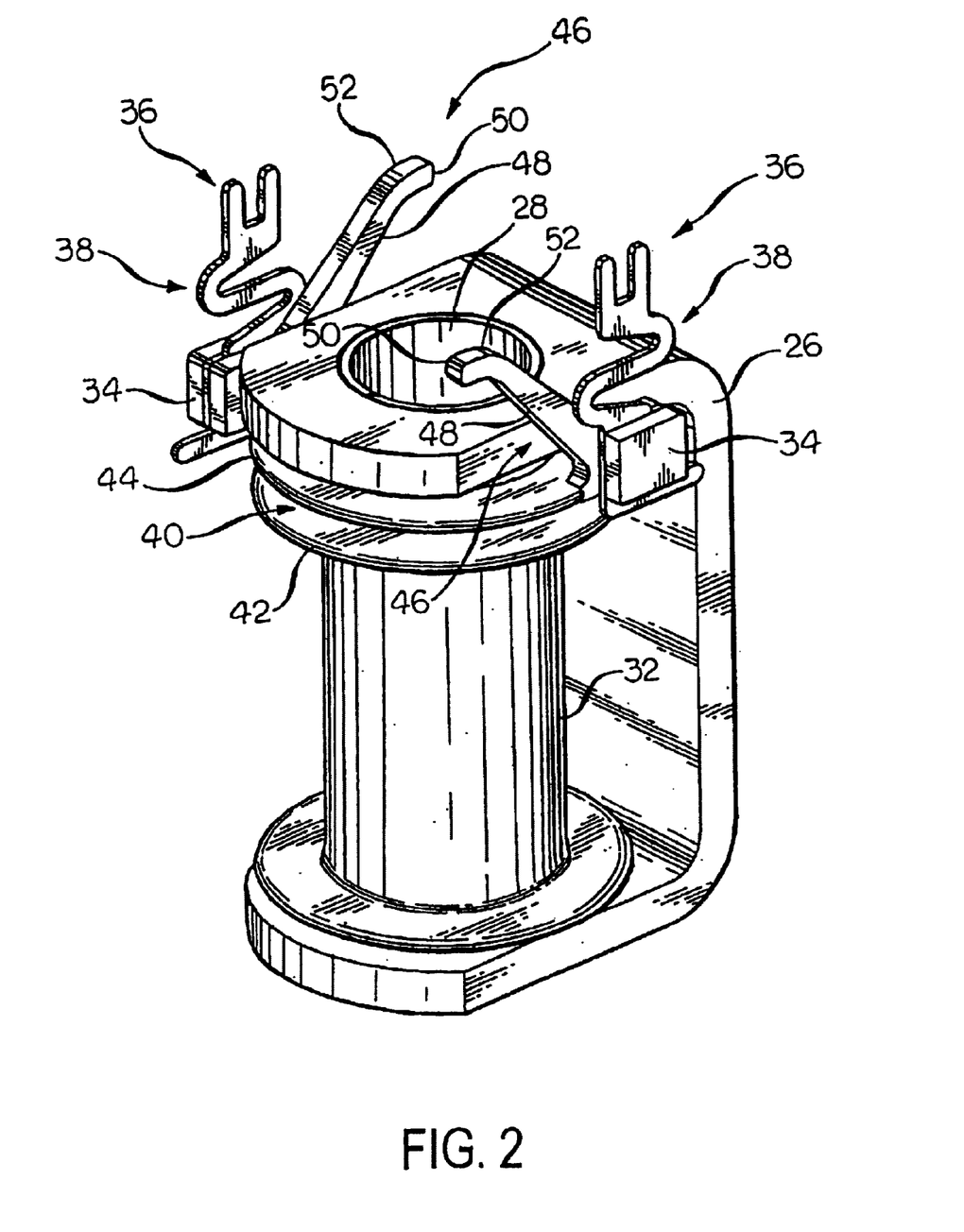
FIG. 2 is a perspective view of the coil assembly shown in FIG. 1.
Figure 3:
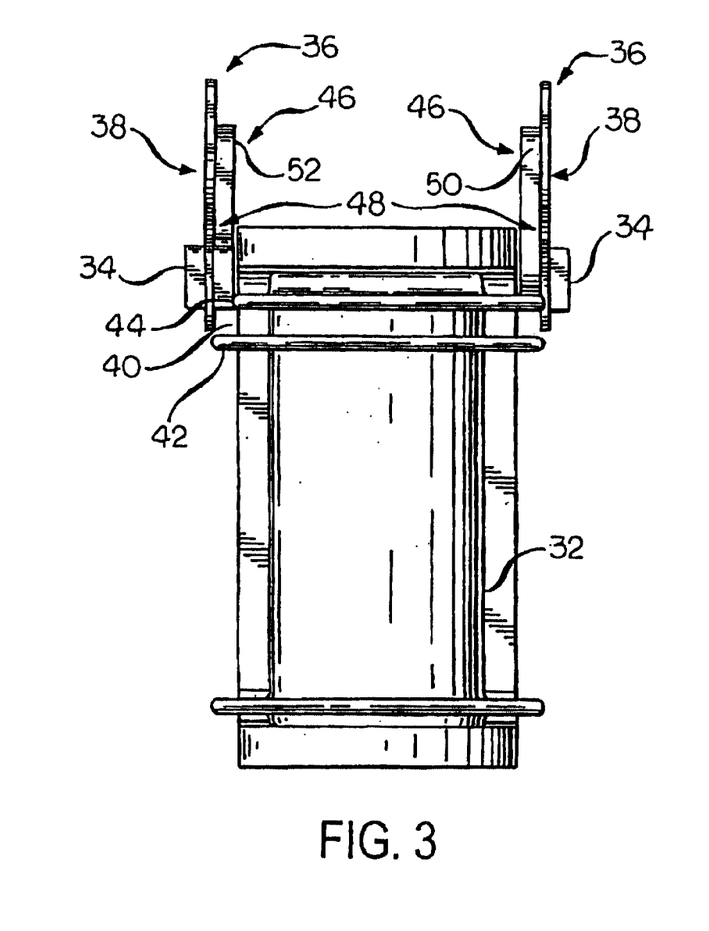
FIG. 3 is a front elevational view of the coil assembly shown in FIGS. 1 and 2.
Figure 4:
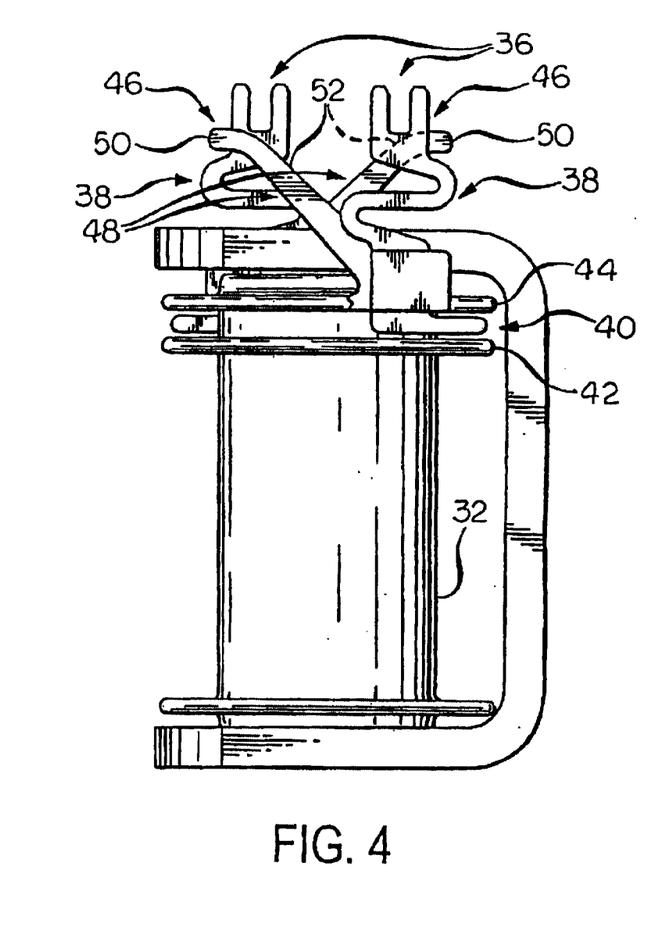
FIG. 4 is a side elevational view of the coil assembly shown in FIGS. 1–3.

In accordance with a preferred embodiment of the present invention, the bobbin 32 is provided with a resilient member, such as a spring, that minimizes axial translation of the bobbin 32. As illustrated in FIGS. 2–4, a pair of springs 46 is supported by the upper end of the bobbin 32. The springs 46 are supported in spaced relation to one another by an uppermost flange 42. Each spring 46 is in the form of an elongate resilient member extending in an upward direction from the uppermost flange 42. A lower end of each spring 46 is preferably molded to the upper flange 44. An intermediate portion 48 of each spring 46 is disposed at an angle between 0 and 90 degrees relative to the uppermost flange 42. An upper end of each spring 46 may be bent to form a substantially horizontally extending portion. The horizontally extending portion defines a contact member 50 that is adapted to engage the lead frame or multi-chip module upon coupling the terminals 36 to the lead frame or multi-chip module. A curved region 52 of each spring 46 provides a smooth transition between the intermediate portion 48 and the contact member 50.

Upon compressing the springs 46, the lead frame or multi-chip module may smoothly traverse the curved region 52. The compressed springs 46 urge the bobbin 32 axially downward along the valve armature 14 and cause the metal flux return casing 26 to contact the valve seat member 20 to complete a magnetic flux return path that is adapted to pass through the armature 14 and the valve seat member 20. The magnetic flux path must be sufficient to pull the armature 14 against the force of the spring 46 to open or close the valve ball 18.

Figure 5:
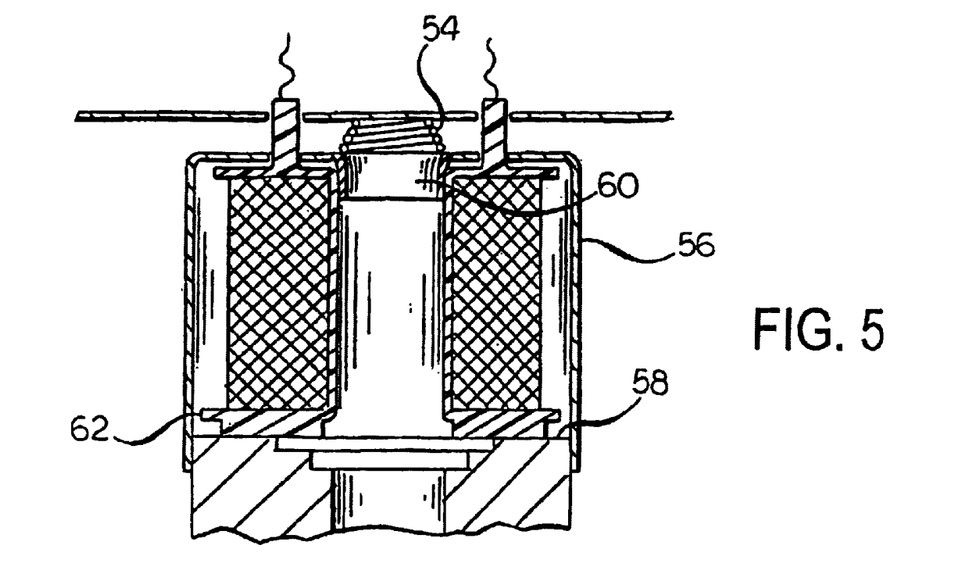
FIG. 5 is a side elevational view of an alternative embodiment of the coil assembly.

An alternative embodiment of the invention is illustrated in FIG. 5. According to this embodiment, a single helical spring 54 is supported by the upper end of a flux return casing 56. The spring 54 is adapted to be compressed between the casing 56 and the lead frame or multi-chip module. When compressed, the spring 54 urges the coil assembly axially downward. The casing 56 is urged into contact with the valve seat member 58 and the flux ring 60 in the opening at the upper end of the bobbin 62. Similar to the springs 46 of the foregoing embodiment, the spring 54 of this embodiment functions to position or locate the coil assembly.

Figure 6:
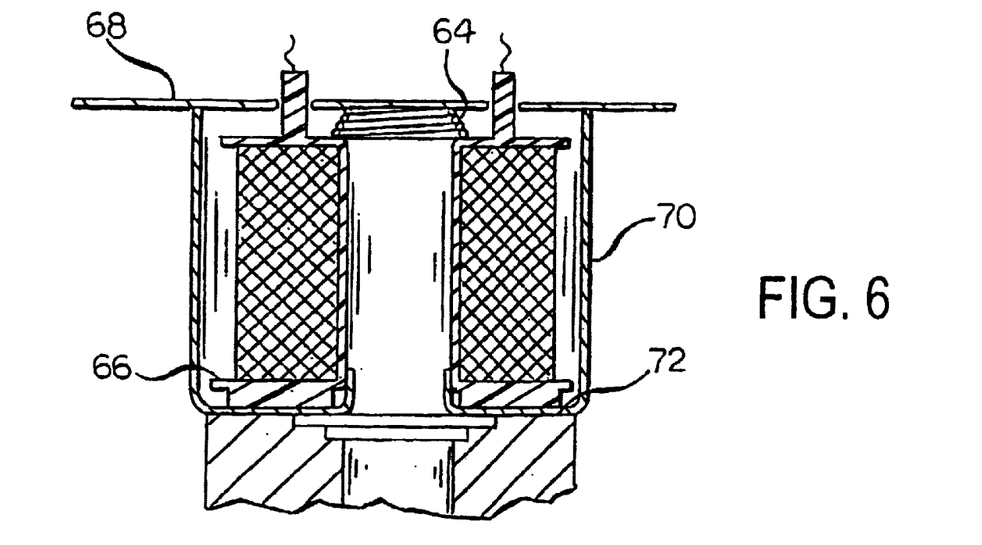
FIG. 6 is a side elevational view of yet another alternate embodiment of the coil assembly.

Yet another embodiment of the invention is illustrated in FIG. 6. This embodiment includes a metal helical spring 64. The spring 64 is dimensioned to receive the armature (not shown) and adapted to be compressed between the bobbin 66 and a metal plate 68. The plate 68 is adapted to engage a metal flux return casing 70. The flux return casing 70, the spring 64, and the plate 68 complete a magnetic flux path that passes through the armature (not shown) and the valve seat member 72. The spring 64 according to this embodiment of the invention functions to position the coil assembly and complete the magnetic flux path.

Figure 7:
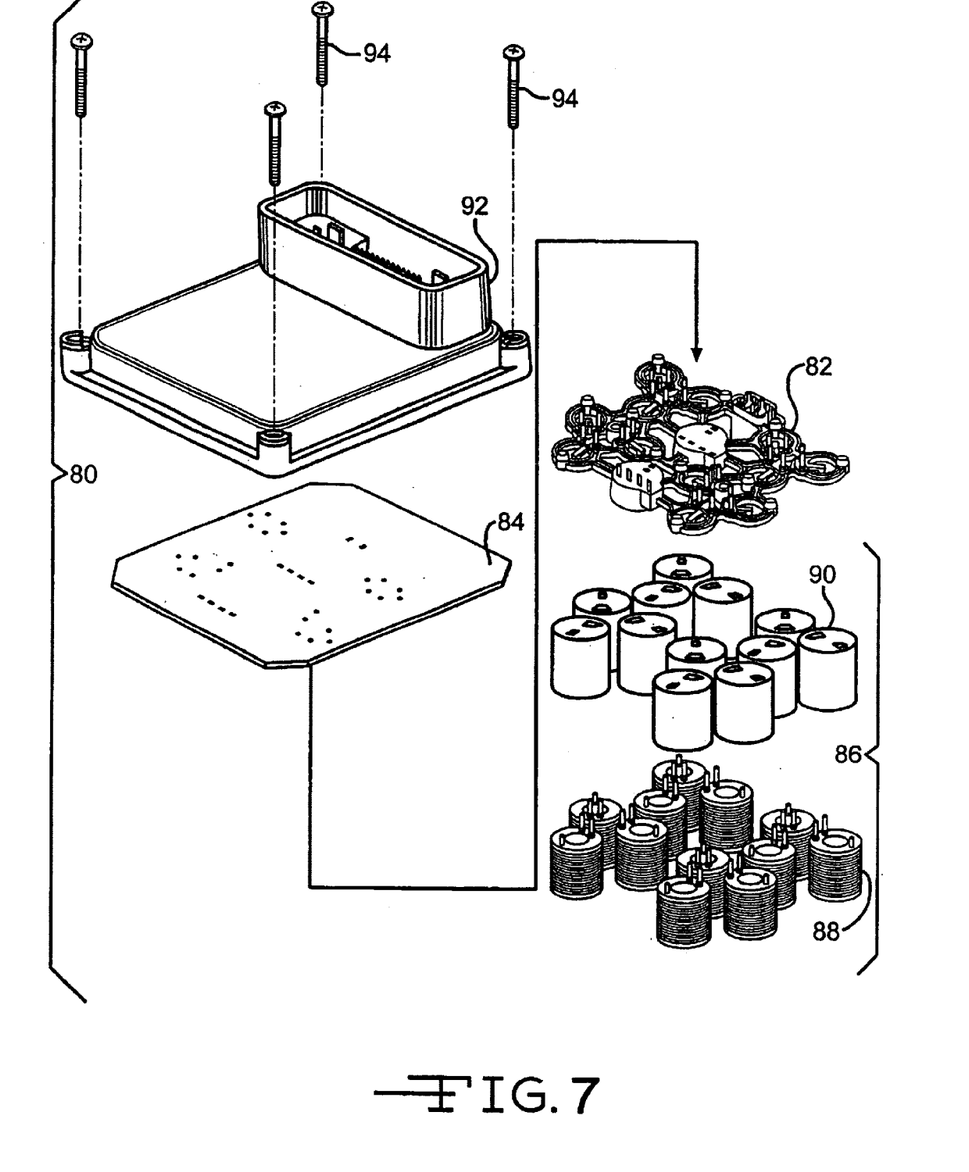
FIG. 7 is an exploded view of an Electronic Control Unit that includes an alternate embodiment of the invention.
Figure 14:
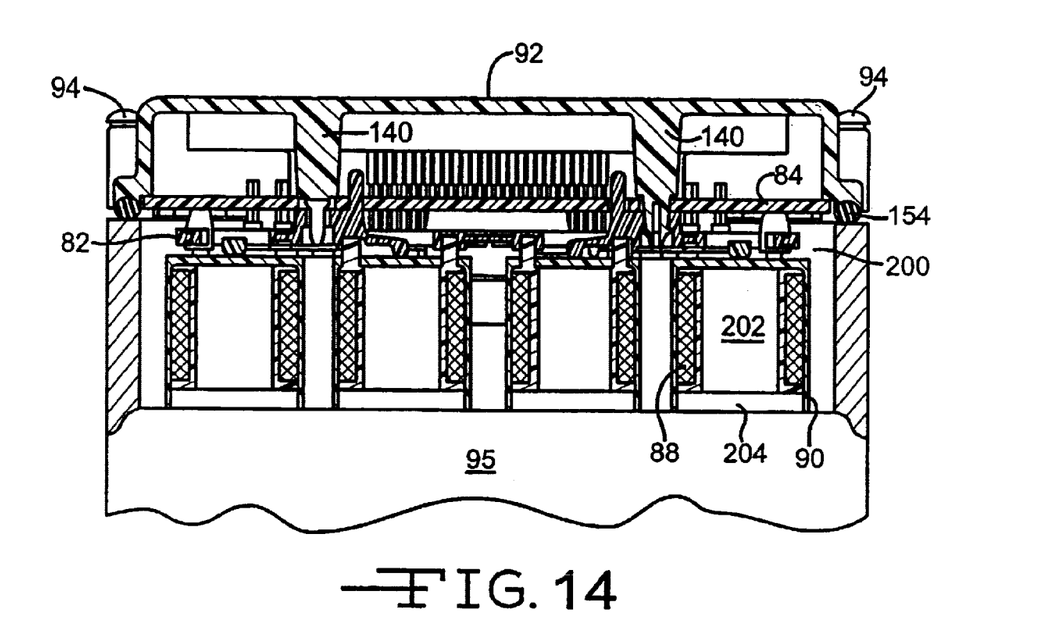
FIG. 14 is a sectional assembly view of the components shown in FIG. 7.

Another alternate embodiment of the invention is illustrated in FIG. 7 where an exploded view of an Electronic Control Unit (ECU) 80 is shown. The ECU 80 includes a coil spacer 82 that is disposed between a Printed Circuit Board (PCB) 84 and a plurality of solenoid coil assemblies 86. Each of the solenoid coil assemblies 86 includes a solenoid coil 88 that is received within a corresponding cup-shaped flux casing 90. The PCB 84 is mounted within a housing 92, as will be described below. A plurality of threaded fasteners 94 removablely secure the assembled ECU 80 to a hydraulic valve body 95, as shown in FIG. 14, to form a hydraulic control unit for a vehicle brake system. As described above, in the preferred embodiment, the ECU 80 and associated hydraulic valve body 95 are included in a vehicle anti-lock brake system. However, depending upon the configuration of the ECU 80 and the associated hydraulic valve body 95, the hydraulic control unit may also be used in a traction control system and/or a vehicle stability control system.

Details of the coil spacer 82 are shown in FIGS. 8 through 11. The coil spacer 82 includes a base 96 having a lattice-like structure. In the preferred embodiment, the coil spacer base 96 is injection molded in one piece from a plastic material. The base 96 includes a plurality of circular coil support rings 98 connected by webs 100 that extend in a radial direction from the rings 98. A motor electrical connector base 102 is disposed between two of the coil support rings 98. A pair of pressure sensor electrical connector bases 104 are also connected by webs 100 to coil support rings 98.

Figure 8:
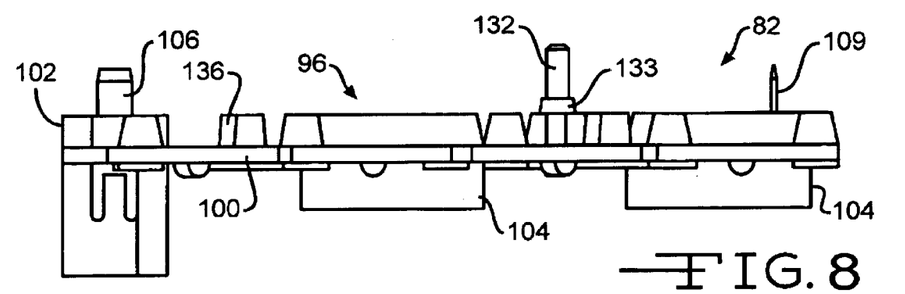
FIG. 8 is a side view of a coil spacer that is shown in FIG. 7.

The motor electrical connector base 102 carries a pair of spade connectors 106 that provide electrical contact between a pump motor connector (not shown) and associated traces deposited upon the PCB 84. As best seen in FIG. 8, the spade connectors 106 extend above the upper surface of the connector base 102. As will be described below, the ends of the spade connectors 106 extend through corresponding apertures formed through the PCB 84 and into electrical contact with traces upon the PCB 84.

In the preferred embodiment, only one of the pressure sensor connector bases 104 carries electrical connectors 108 since the unit is intended for use with a hydraulic valve body having a single pressure sensor. However, the base 96 is designed to support two pressure sensors by simply adding a set of electrical connectors 108 to the second base 104. Alternately, the invention may be practiced with a base 96 that includes only one pressure sensor connector base (not shown) or three or more pressure sensor connector bases (also not shown). Similar to the motor spade connectors 106, the electrical connectors 108 include a plurality of pins 109 that extend above the connector base 104 and through the PCB 84 to form an electrical connection with associated traces.

Figure 11:
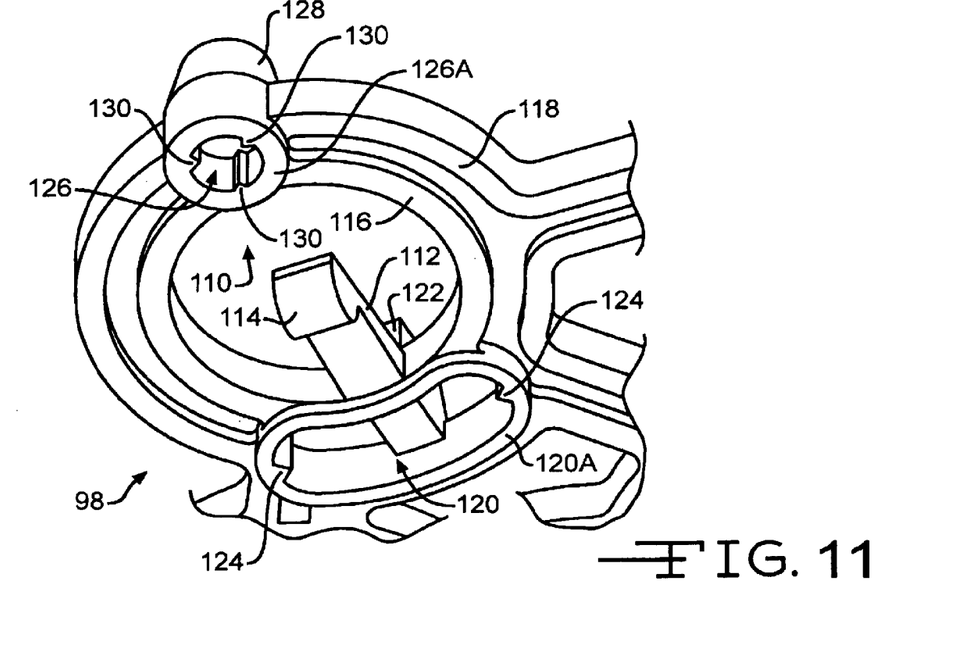
FIG. 11 is a enlarged partial view of the coil spacer shown in FIG. 10.

An enlarged perspective drawing one of the coil support rings 98 is shown in FIG. 11. The view of FIG. 11 is taken as looking upward toward the lower surface of the base 96. An aperture 110 is formed through the center of the coil support ring 98. A finger 112 extends radially from the circumference of the aperture 110 into the center thereof. A semicircular tab 114 is formed upon the end of the finger 112 and extends in a downward direction in FIG. 11. Upon assembly of the ECU 80 onto the hydraulic valve body 95, the finger 112 is flexed in the upper direction by an associated solenoid coil flux casing 90 (not shown). The resiliency of the plastic forming the finger 112 causes the tab 114 to exert a downward force upon the flux casing 90, urging the casing 90 into contact with an associated solenoid valve sleeve 202, as illustrated in FIG. 14. An inner raised portion 116 and an outer raised portion 118 are formed upon the surface of the coil support ring 98 and extend along the connecting webs 100. The raised portions 116 and 118 add rigidity to the coil spacer 82 while allowing removal of material therebetween to reduce weight.

A kidney-shaped opening 120 is formed through a portion of the coil support ring 98. As best seen in FIG. 11 a rectangular spacer 122 extends in an upward direction from the center of the opening 120. Upon assembly of the ECU 80, the spacer contacts the lower surface of the PCB 84 and cooperates therewith to vertically offset the base 96 from the PCB 84. A pair of crush ribs 124 extend into the opening 120 from opposite ends thereof. The opening 120 receives a coil lead support tower (not shown) formed upon a solenoid coil bobbin. The crush ribs 124 cooperate with the coil lead support tower to retain the coil upon the coil spacer 82 during assembly of the ECU 80. Similarly, a locator bore 126 extends into a spacer post 128 that is formed upon the coil support ring 98 across the aperture 110 from the kidney-shaped opening 120. The locator bore 126 receives a locator pin (not shown) formed upon the coil bobbin to position the bobbin upon the coil spacer 82. As best seen in FIG. 11, in the preferred embodiment, three crush ribs 130 are formed upon the inner surface of the locator bore 126.

The crush ribs 130 cooperate with the bobbin locator pin to secure the bobbin upon the coil spacer 82. It will be appreciated, however, that the invention also can be practiced with more or less crush ribs than are shown in FIG. 11. As will be explained below, the retention of the coil bobbins upon the coil spacer 82 enhances the electrical connection of the coil leads to electrical traces deposited upon the PCB 84. In the preferred embodiment, the coil leads are wave soldered to the electrical traces; however, the invention can be practiced using any conventional process for soldering, wielding or press fitting can be use for forming an electrical connection, such as, for example, reflow soldering, laser welding or a press fit connection.

As shown in FIG. 11, a first raised portion 120A and a second raised portion 126A are formed upon the surface of the coil support ring 98. The first raised portion 120A extends around the kidney-shaped aperture 120 while the second raised portions 126A extends around the locator bore 126. The thickness of the raised portions 120A and 126A determine the vertical displacement that occurs when the finger 112 is flexed; and, in turn, the force exerted by the tab 114 upon the flux casing and coil.

Figure 12:
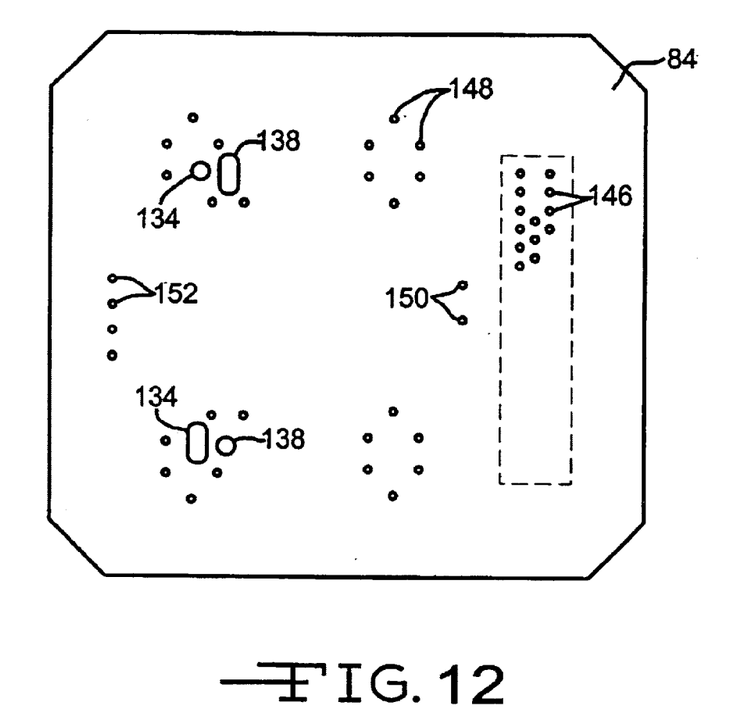
FIG. 12 is view of a printed circuit board that is shown in FIG. 7.

As best seen in FIG. 8, a pair of coil spacer locator posts 132 (one shown) extend in an upward direction from the upper surface of the coil spacer 82. A plurality of crush ribs 133 are formed on the base of each of the locator posts 133. The coil spacer locator posts 132 and crush ribs 133 cooperate with corresponding coil spacer locator apertures 134 formed through the PCB 84 to locate and retain the coil spacer 82 upon the PCB 84. As best seen in FIG. 12, one of the coil spacer locator apertures 134 has a circular shape while the other has an oval shape. It is contemplated each of the apertures 134 receives one of the spacer locator posts 132. The oval shaped aperture allows the coil spacer 82 to pivot about the locator post 132 that extends through the circular one of the apertures 134. The resulting movement of the coil spacer 82 relative to the PCB 84 provides compensation for manufacturing tolerances.

Figure 9:
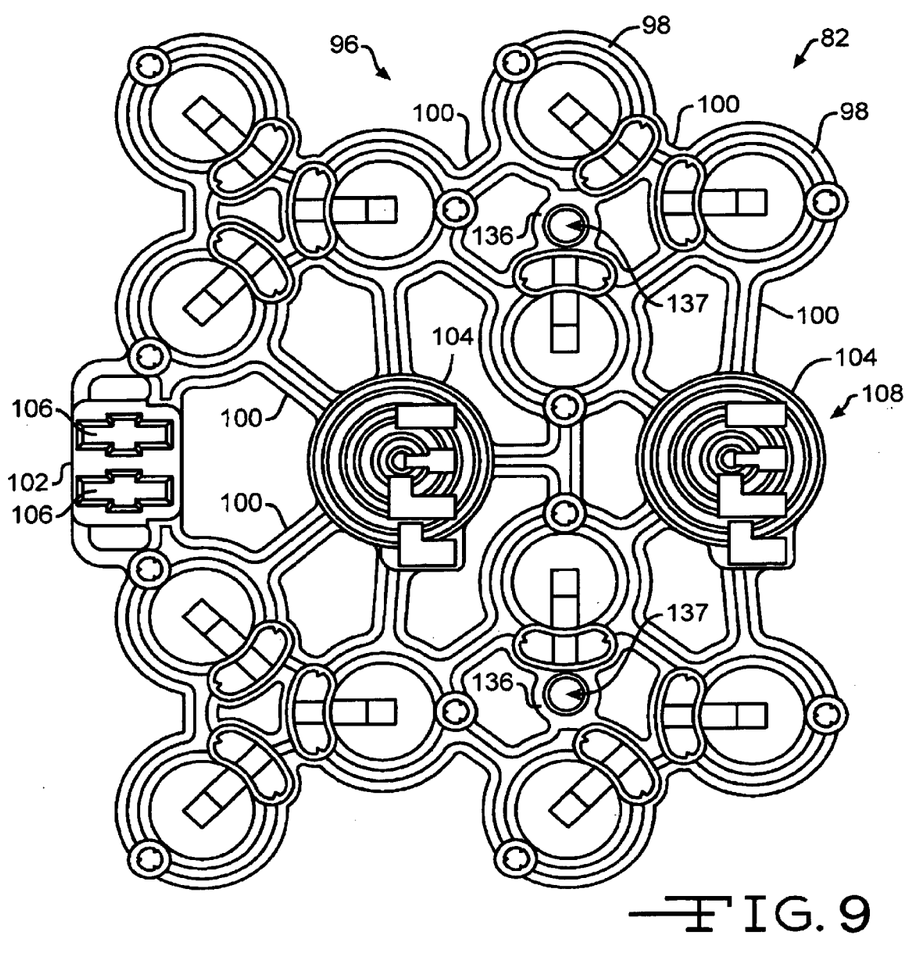
FIG. 9 is a bottom view of the coil spacer that is shown in FIG. 8.
Figure 10:
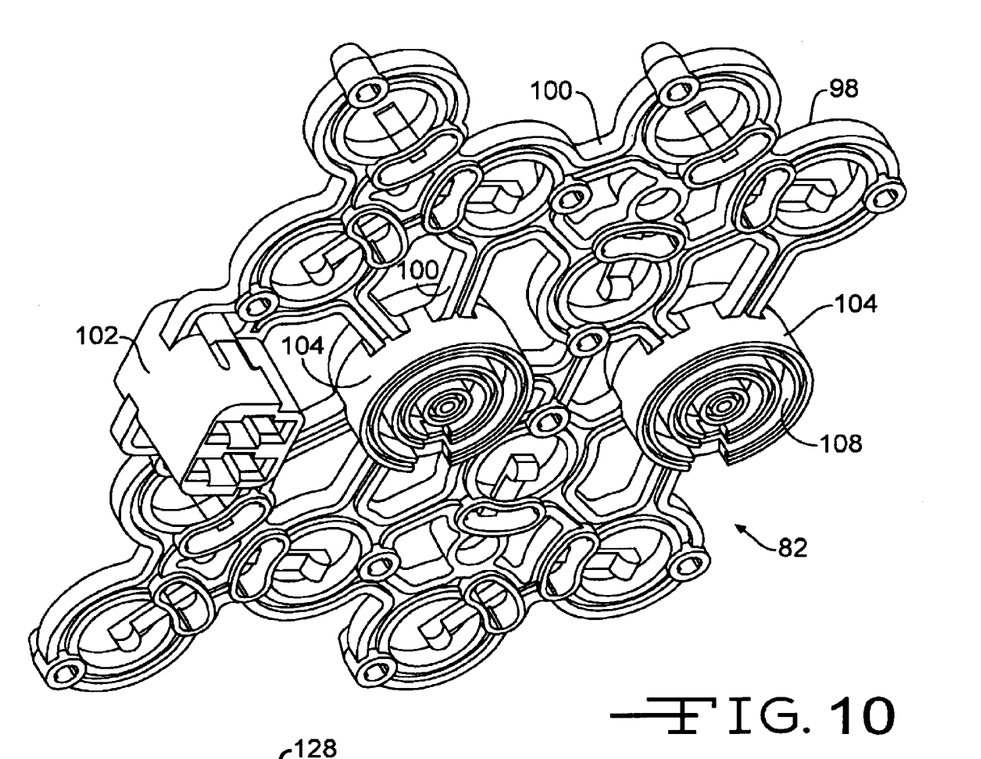
FIG. 10 is a perspective view of the coil spacer shown in FIGS. 7 and 8 as seen from below.

As shown in FIGS. 8 and 9 a pair of bosses 136 are formed in the coil spacer base and extend in an upward direction from the upper surface of the coil spacer 82. A stepped bore 137 having a wider diameter end portion extends through each of the bosses 136. The function of the stepped bore 137 will be explained below.

Figure 13:
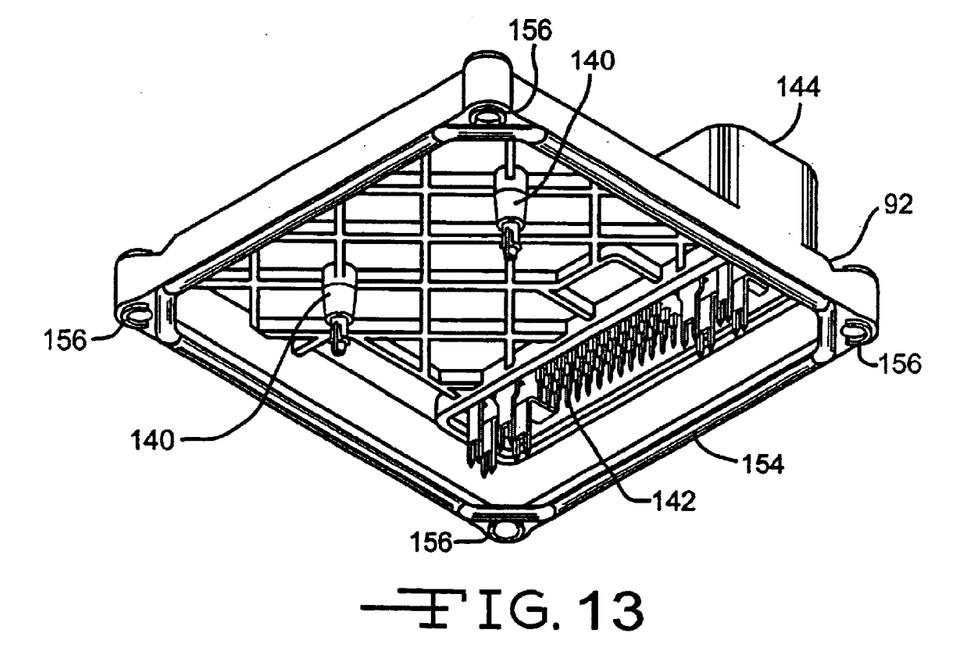
FIG. 13 is a perspective view of a housing that is shown in FIG. 7 as seen from below.

Returning to the plan view of the PCB 84 shown in FIG. 12, a pair of housing locator apertures 138 also are formed through the PCB 84. It will be appreciated that the drawing of the PCB 84 shown in FIG. 12 has been simplified for clarity. Similar to the coil spacer locator apertures 134, one of the housing locator apertures 138 has a circular shape while the other has an oval shape. The housing locator apertures 138 function to position a coil spacer/PCB assembly within the housing 92 by receiving a pair of housing locator posts 140 that extend in a downward direction from the inside of the housing 92, as shown in FIG. 13. Thus, similar to the coil spacer locator posts 132, the oval housing locator aperture allows the PCB 84 to pivot about about the housing locator post 140 that extends through the circular one of the apertures 138. The resulting relative movement between the PCB 84 and housing 92 provides compensation for manufacturing tolerances.

Also shown in FIG. 13 are a plurality of pins 142 that extend from an ECU electrical connector 144 formed upon the housing 92. In the preferred embodiment, the housing 92 is injection molded from a plastic material. Upon assembly of the ECU 80, the ends of the electrical connector pins 142 are received by a plurality of connector apertures 146 formed through the PCB 84. Similarly, clusters of coil apertures 148 are formed through the PCB 148. In the preferred embodiment, each cluster includes six coil apertures 148 with pairs of apertures 148 in each cluster receiving the lead ends from three solenoid coils 88; however, the invention also can be practiced with the coil apertures 148 arranged differently (not shown) upon the PCB 84. A pair of motor apertures 150 receive the ends of the motor spade connectors 106 while four pressure sensor apertures 152 receive the ends of the pressure sensor connector pins 109. The electrical connectors extend through the apertures formed through the PCB 84. Upon soldering, the connectors will be electrical contact with electrical traces (not shown) formed upon the surface and the inner layers of the PCB 84.

As best seen in FIG. 13, a continuous bead 154 of resilient material extends about the perimeter of the lower edge of the housing 92. Upon assembly, the bead 154 forms a seal between the ECU 80 and the surface of the hydraulic valve body 95, as shown in FIG. 14. A plurality of apertures 156 formed in the corners of the housing 92 receive the threaded fasteners 94 that secure the ECU housing 92 to the hydraulic valve body 95.

Figure 15:
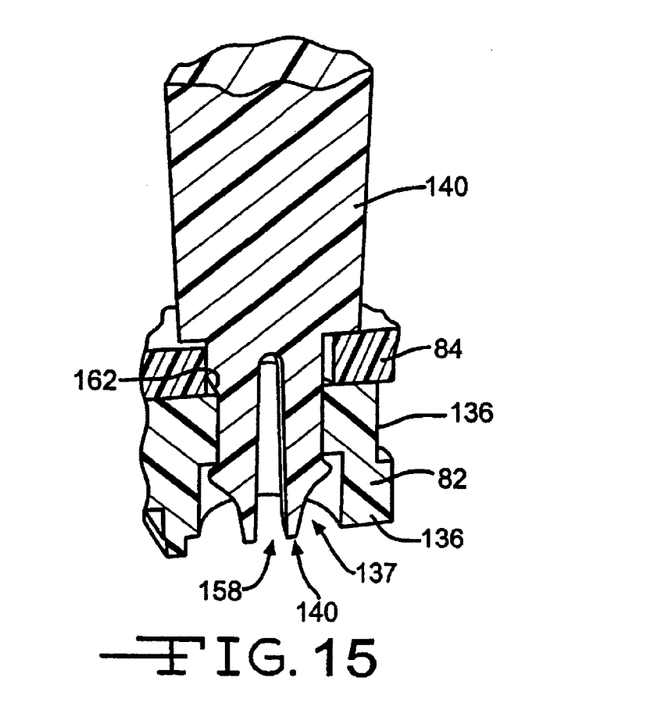
FIG. 15 is an enlarged perspective view of a portion of FIG. 15.

As best seen in FIG. 15, the housing locator posts 140 include slots 158 formed in the ends thereof. Barbs 160 extend from the ends of each of the posts 140. Crush ribs 162 extend in a radial direction from the base of each of the locator posts 140. Upon assembly of the ECU 80, the locator posts 140 first pass through the housing locator apertures 138 in the PCB 84. The post slots 148 are then compressed to allow the barbs 160 to enter into the reduced diameter portion of the stepped bore 137 formed in the coil spacer bosses 136. The resiliency of the locator post material then urges the barbs 160 apart upon entry of the barbs 160 into the wider diameter portion of the stepped bore 137. Additionally, as also shown in FIG. 15, the crush ribs 162 press against the surface of the apertures 138 formed in the PCB 84. Thus, the barbs 160 and crush ribs 162 cooperate with their respective apertures 137 and 138 formed through the coil spacer 82 and PCB 84 to retain the coil spacer 82 and the PCB 84 upon the cover 92.

Figure 16:
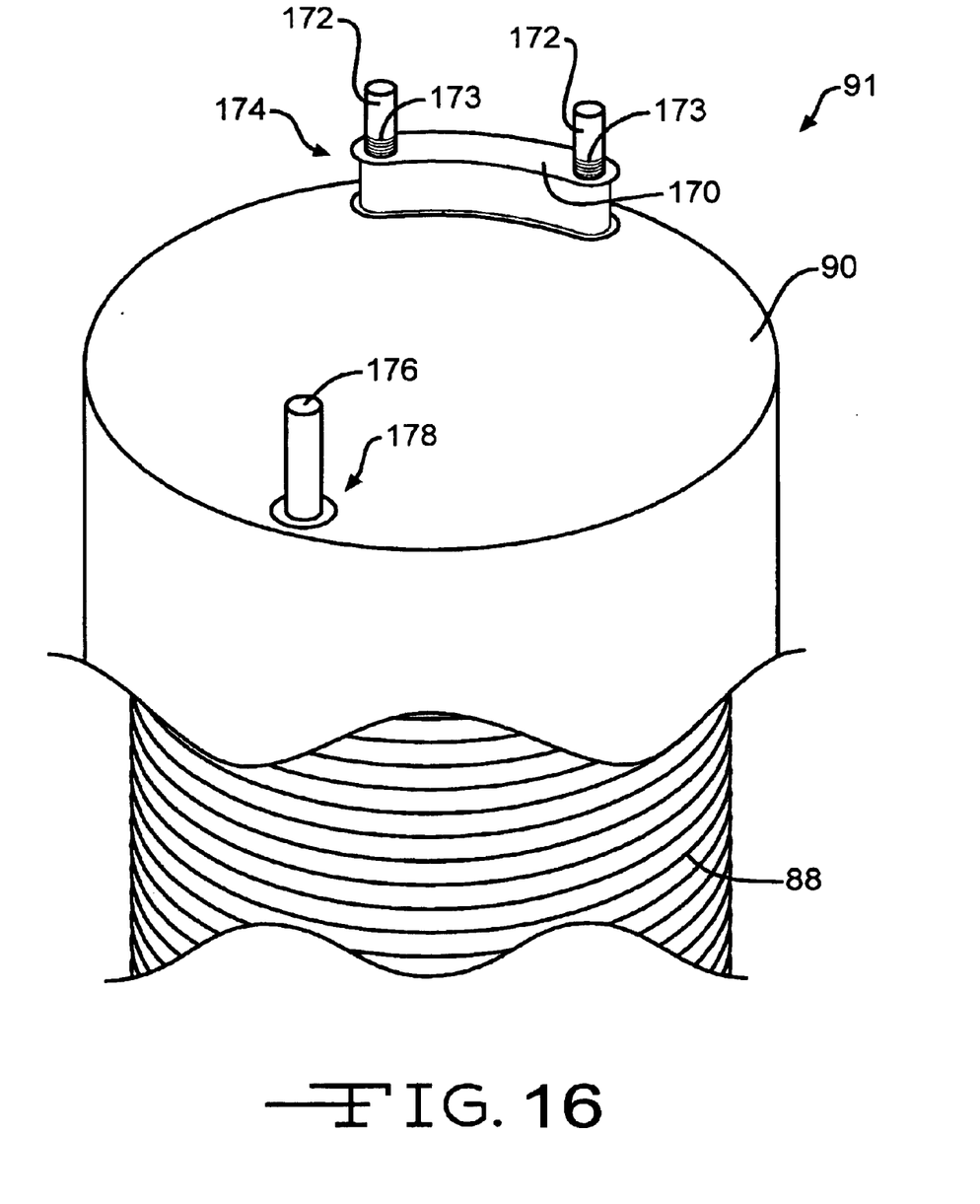
FIG. 16 is a fragmentary perspective view of a coil and flux ring assembly that is shown in 14.

The invention also contemplates a coil bobbin structure that provides a mechanical alignment of the solenoid coils 88 within their flux casings 90, as illustrated in FIG. 16. A kidney-shaped coil lead support tower 170 extends in an axial direction from one end of the solenoid coil bobbin (not shown). The kidney shape of the coil lead support tower 170 corresponds to the shape of the kidney shaped openings 120 formed through each of the coil support rings 98 of the coil spacer 82. Two coil leads 172 extend from the coil lead support tower 170. Ends 173 of the coil winding extend through axial slots (not shown) formed in the surface of the support tower 170 and are wrapped around the bases of the coil leads 172. The coil winding ends 173 are soldered to the coil leads 172. Upon insertion of the solenoid coil 88 into the flux casing 90, the coil lead support tower 170 extends through a similar kidney-shaped opening 174 formed through the closed end of the flux casing 90. Additionally, a coil locator post 176 formed upon the same end of the solenoid bobbin (not shown) extends through a second opening 178 formed through the closed end of the flux casing 90. In the preferred embodiment, the coil lead support tower 170 and the coil locator post 176 are integrally formed with the coil bobbin (not shown).

Upon assembly of the solenoid coil 88 and flux casing 90 upon the coil spacer 82, the coil leads 172 extend through the kidney-shaped opening 120 formed through the coil support ring 98 with one of the coil leads 172 passing on each side of the rectangular spacer 122. The coil lead support tower 170 is received within the kidney shaped opening 120 while the crush ribs 124 formed within the opening 120 co-operate with the support tower 170 to retain the solenoid coil 88 and flux casing 90 upon the coil spacer 82. Additionally, the coil locator post 176 is received by the corresponding locator bore 126 formed in the coil support ring 98 opposite from the kidney-shaped opening 120. The crush ribs 130 formed within the locator bore 126 co-operate with the coil locator post 176 to also retain the solenoid coil 88 and flux casing 90 upon the coil spacer 82.

Figure 17:
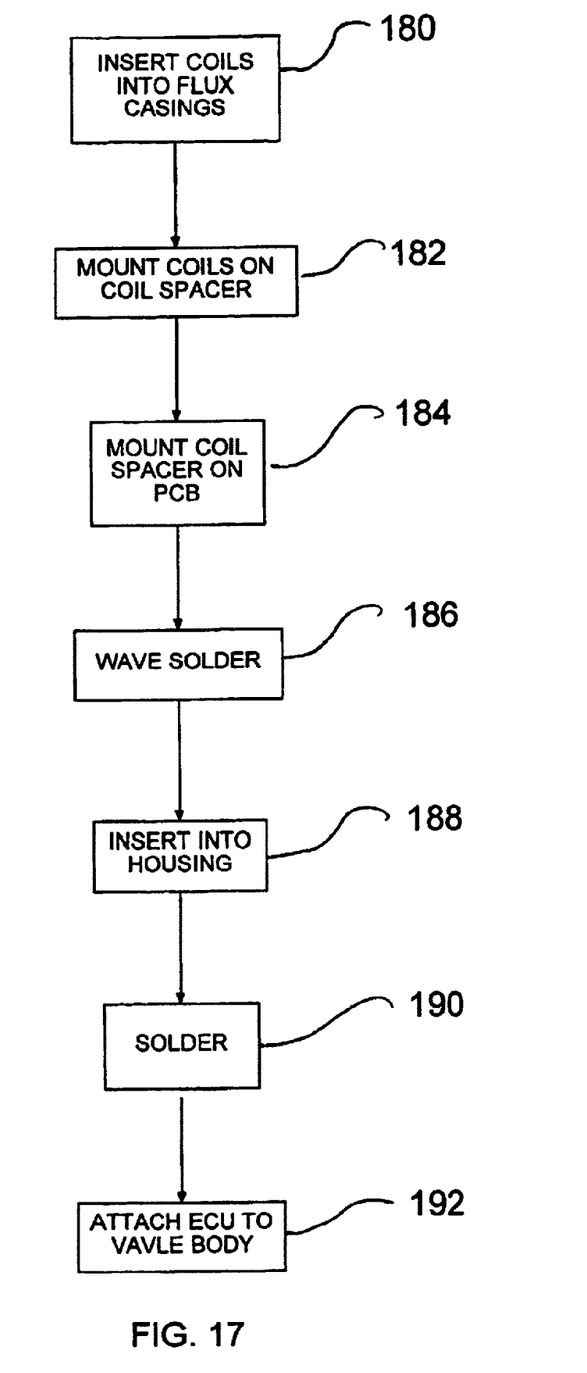
FIG. 17 is a flow chart for a method of assembly for the Electronic Control Unit shown in FIG. 7.

The present invention also contemplates a method for assembling an ECU 80 that is illustrated by the flow chart shown in FIG. 17. In functional block 180, each of the solenoid coils 88 is inserted into a flux casing 90 with the lead support towers 170 and locator pins 176 extending through the corresponding openings 174 and 178 in the closed end of the flux casings 90 to form coil assemblies 91. Each of the coil assemblies 91 is mounted upon a coil spacer 82 in functional block 182 by inserting the upper portions of the lead support towers 170 and locator pins 176 into the corresponding openings 120 and 126 in a coil support ring 98.

In functional block 184, the coil spacer 82 is mounted upon a PCB 84 with the coil spacer locator pins 132 extending through the corresponding openings 134 in the PCB 84. Additionally, the coil leads 172 extend through corresponding apertures 148 formed through the PCB 84. Similarly, the ends of the motor and pressure sensor electrical connectors 106 and 109 extend through corresponding apertures 150 and 152 formed through the PCB 84. In functional block 186, the ends of the coil leads 172 and the motor and pressure sensor electrical connectors 106 and 109 are electrically connected to the PCB via and traces to form a PCB and coil spacer assembly. The coil leads 172 and connectors 106 and 109 for the motor and pressure sensor contact electrical traces deposited upon the surface of and inner layers of the PCB 84. While wave soldering is shown as the preferred embodiment, it will be appreciated that other conventional soldering techniques also may be utilized to make the electrical connection.

The PCB and coil spacer assembly is inserted into a housing in 92 functional block 188 with the housing locator pins 140 being received by and retained within the corresponding apertures 138 and 134 formed through the PCB 84 and coil spacer 82. At the same time, the ends of the housing electrical connector pins 142 are received in corresponding apertures 146 that are formed through the PCB 84. Then, in functional block 190, the ends of the electrical connector pins 142 are soldered to the corresponding apertures and electrical traces of the PCB 84 to form an ECU 80. In the preferred embodiment, the electrical connectors are wave soldered to the electrical traces; however, the invention can be practiced using any conventional process for soldering, wielding or press fitting can be use for forming an electrical connection, such as, for example, reflow soldering, laser welding or a press fit connection. The present invention contemplates that the size and shape of the coil spacer 82 allows access for soldering or welding of the electrical connector pins 142. Alternately, the connector pins 142 can be press fit to the PCB 84. Finally, in functional block 192, the ECU 80 is mounted upon a hydraulic valve body 95 and secured thereto with a plurality of fasteners 94.

As shown in FIG. 14, the coil assemblies 91 extend into a recess 200 formed in the upper surface of the valve body 95. The bobbin included in each of the coil assemblies 91 receives a solenoid valve sleeve 202 that contains an axially movable armature (not shown). Also, upon assembly of the ECU 80 upon a valve body 95, a pressure sensor mounted upon the valve body 95 and its electrical connector is completely enclosed within the assembled unit. Similarly, the motor electrical connector is completely enclosed within the assembled unit.

As described above, upon assembly of the ECU 80 upon a hydraulic valve body 95, the resilient members 112 urge the flux casing against the solenoid valve sleeve 202, as illustrated in FIG. 14. The resulting contact between the flux casing and valve body 95 enhances both the flux path for the magnetic field generated by each of the solenoid coils and the transfer of heat from the coils to the valve body. Since the valve body 95 is typically metal, it forms a heat sink for the solenoid coils 88. As shown in FIG. 14, flux rings 204 are disposed between the lower end of each of the coils 88 and the upper surface of the valve body 95. The flux rings 204 can be either included in the coil assemblies 91 or formed integrally upon the solenoid sleeves 202. In either case, the flux rings are formed from a ferro-magnetic material, such as, for example, steel, and are conductive to both flux and heat. Alternately, the flux rings can be omitted (not shown) with the result that the lower ends of the bobbins directly contact the valve body surface.

It will be appreciated that the coil spacer 82 shown in the figures and described above is exemplary and that the configuration of the coil spacer can be different from that which has been shown. For example, another coil spacer may receive more or less solenoid coils. Additionally, the invention also can be practiced with the pressure sensor connector and/or motor connector omitted and an overmolded leadframe can be substituted for the PCB.

It will be noted that the invention compensates for manufacturing tolerances in both the vertical and horizontal directions for assembly of ECU's upon hydraulic valve bodies.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A control unit for a vehicle brake system, the control unit comprising:
   a housing adapted to be mounted upon a hydraulic valve body;
   a circuit substrate mounted within said housing;
   a coil spacer mounted upon said substrate; said coil spacer including at least one coil support ring having a resilient member extending in a radial direction from the edge of said ring into the center of said ring; and
   a solenoid coil and flux casing assembly mounted upon said coil spacer ring; said solenoid coil and flux casing assembly flexing said resilient member such that said resilient member urges said flux casing away from said coil spacer.

2. A control unit according to claim 1 wherein said coil spacer also includes an electrical connector for at least one pressure sensor.

3. A control unit according to claim 2 wherein said coil spacer further includes an electrical connector for a pump motor.

4. A control unit according to claim 3 wherein said coil spacer includes a plurality of coil support rings and further wherein a plurality of solenoid coils are mounted upon said coil spacer with each solenoid coil corresponding to one of said coil support rings.

5. A control unit according to claim 3 wherein said housing includes at least one locator post extending from said housing and further wherein said circuit substrate and coil spacer each have at least one locator aperture formed therethrough, said locator apertures co-operating with said housing locator post to position said circuit substrate and coil spacer within said housing.

6. A control unit according to claim 5 wherein said locator aperture is a first aperture and circuit substrate and said coil spacer each include a second locator aperture, said first aperture being circular and said second aperture being non-circular and further wherein said housing includes a second locator post with said first and second locator posts extending through said first and second apertures such that said non-circular aperture allows movement of said circuit substrate and said coil spacer relative to said housing.

7. A control unit according to claim 5 wherein said coil support rings are connected by webs that extend in a radial direction between pairs of said coil support rings, said webs defining a lattice-like structure.

8. A control unit according to claim 5 wherein said housing locator post has a slotted end with at least one barb formed thereon and further wherein said coil spacer locator aperture includes a stepped bore whereby said slot allows said locator post to pass through a smaller diameter portion of said stepped bore with said barb co-operating with a larger diameter portion of said stepped bore to secure said coil spacer within said housing.

9. A control unit according to claim 5 wherein said coil spacer support ring has an aperture formed therethrough, said aperture including at least one crush rib extending therein and further wherein said solenoid coil has a lead support post that extends through said support aperture, said lead support post cooperating with said crush rib to retain said coil upon said coil spacer.

10. A control unit according to claim 9 wherein said aperture in said coil spacer support ring is a first aperture and said coil spacer support ring has a second aperture formed therethrough and further wherein said solenoid coil also has a locator post formed thereon that extends through said second support ring aperture whereby said solenoid coil is positioned upon said coil spacer.

11. A control unit according to claim 10 wherein said second aperture has at least one crush rib extending therein and further wherein said solenoid coil locator post cooperates with said crush rib to retain said coil upon said coil spacer.

12. A control unit according to claim 5 wherein said circuit substrate is a printed circuit board, said printed circuit board having a plurality of components mounted thereupon.

13. The control unit according to claim 1 further including a hydraulic valve body adapted to be connected to a vehicle hydraulic brake system, said hydraulic valve body having at least one solenoid valve mounted thereon corresponding to said solenoid coil and flux casing assembly, said housing being removably attached to said hydraulic valve body and toward said valve body.

14. The control unit according to claim 13 wherein a pressure sensor is mounted upon said hydraulic valve body and further wherein said coil spacer also carries a pressure sensor electrical connector, said pressure sensor electrical connector being enclosed within the control unit and electrically connecting said pressure sensor to said circuit substrate.

15. A control unit according to claim 14 wherein said coil spacer also carries a motor electrical connector, said motor electrical connector connecting a pump motor carried by said hydraulic valve body to said circuit substrate and being enclosed within the control unit.

16. A method for assembling a control unit for a vehicle brake system, the method comprising the steps of:
 (a) providing a coil spacer that includes a base having at least one coil support ring, the coil support ring including resilient member extending in a radial direction from the edge thereof and into the center of the support ring;
 (b) mounting at least one solenoid coil and flux casing assembly upon the coil spacer ring with the coil and flux casing assembly flexing the resilient member such that the resilient member urges the flux casing away from the coil spacer base;
 (c) mounting the coil spacer upon a circuit substrate to form an assembly;
 (d) inserting the circuit substrate and coil spacer assembly into a housing.

17. A method for assembling a control unit according to claim 16 further including the step of:
 (e) mounting the housing upon a hydraulic valve body.

* * * * *

UNITED STATES PATENT AND TRADEMARK OFFICE
CERTIFICATE OF CORRECTION

| | | |
|---|---|---|
| PATENT NO. | : 6,985,060 B2 | Page 1 of 1 |
| APPLICATION NO. | : 10/468226 | |
| DATED | : January 10, 2006 | |
| INVENTOR(S) | : Dion S. Parker et al. | |

It is certified that error appears in the above-identified patent and that said Letters Patent is hereby corrected as shown below:

Column 12, Claim 13, Line 12, delete "and" and insert --with said resilient member urging said flux casing--.
Column 12, Claim 16, Line 30, after the "ing" insert an --a--.

Signed and Sealed this

Eleventh Day of July, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,985,060 B2 | Page 1 of 1 |
| APPLICATION NO. | : 10/466226 | |
| DATED | : January 10, 2006 | |
| INVENTOR(S) | : Dion S. Parker et al. | |

It is certified that error appears in the above-identified patent and that said Letters Patent is hereby corrected as shown below:

Column 12, Claim 13, Line 12, delete "and" and insert --with said resilient member urging said flux casing--.
Column 12, Claim 16, Line 30, after the "ing" insert an --a--.

This certificate supersedes Certificate of Correction issued July 11, 2006.

Signed and Sealed this

Fifteenth Day of August, 2006

JON W. DUDAS
*Director of the United States Patent and Trademark Office*